United States Patent
Hiramatsu et al.

(10) Patent No.: US 9,027,728 B2
(45) Date of Patent: May 12, 2015

(54) SEGMENT TYPE FRICTION MATERIAL

(75) Inventors: Hiroaki Hiramatsu, Toyota (JP); Yoshihito Fujimaki, Toyota (JP)

(73) Assignee: Aisin Kako Kabushiki Kaisha, Aichi-ken (JP)

( * ) Notice: Subject to any disclaimer, the term of this patent is extended or adjusted under 35 U.S.C. 154(b) by 188 days.

(21) Appl. No.: 13/496,094

(22) PCT Filed: Jul. 27, 2010

(86) PCT No.: PCT/JP2010/062589
§ 371 (c)(1), (2), (4) Date: Mar. 14, 2012

(87) PCT Pub. No.: WO2011/033861
PCT Pub. Date: Mar. 24, 2011

(65) Prior Publication Data
US 2012/0175216 A1   Jul. 12, 2012

(30) Foreign Application Priority Data

Sep. 15, 2009   (JP) ................................. 2009-212819

(51) Int. Cl.
*F16D 13/64*   (2006.01)
*F16D 13/72*   (2006.01)
*F16D 65/12*   (2006.01)
*F16D 69/00*   (2006.01)

(52) U.S. Cl.
CPC .............. *F16D 13/648* (2013.01); *F16D 13/72* (2013.01); *F16D 65/122* (2013.01); *F16D 2069/004* (2013.01)

(58) Field of Classification Search
USPC .................................................... 192/113.36
See application file for complete search history.

(56) References Cited

U.S. PATENT DOCUMENTS

| 5,094,331 | A  | * | 3/1992 | Fujimoto et al. ........... 192/70.12 |
| 2002/0046912 | A1 | | 4/2002 | Suzuki |
| 2002/0084667 | A1 | | 7/2002 | Sutou et al. |
| 2007/0102258 | A1 | * | 5/2007 | Miyazaki et al. ........ 192/113.36 |
| 2008/0006504 | A1 | * | 1/2008 | Sudau et al. ............. 192/113.36 |
| 2009/0050434 | A1 | | 2/2009 | Okamura et al. |
| 2013/0168199 | A1 | * | 7/2013 | Higashijima et al. .... 192/107 M |

FOREIGN PATENT DOCUMENTS

| JP | 11-303902 A | 11/1999 |
| JP | 2001-295859 A | 10/2001 |
| JP | 2002-130323 A | 5/2002 |
| JP | 2004-211781 A | 7/2004 |
| JP | 2007-263203 A | 10/2007 |
| JP | 2009-068689 A | 4/2009 |

OTHER PUBLICATIONS

Machine translation of JP 2007-263203, downloaded from EPO.org on Feb. 6, 2014.*

* cited by examiner

*Primary Examiner* — Richard Lorence
(74) *Attorney, Agent, or Firm* — Sughrue Mion, PLLC; Richard C. Turner

(57) ABSTRACT

A segment-type friction material comprises segment pieces each having a supply passage formed thereon to supply lubricating oil to a surface of each of the segment pieces. The segment-type friction material further comprises oil grooves each having an outer peripheral opening portion extended in a curved shape or a linear shape. Thereby, lubricating oil is sufficiently supplied to the surface of each of the segment pieces from an outer peripheral side thereof or an inner peripheral side thereof and a clearance between the segment-type friction material and its associated separator plate is assured. Moreover, a space for the lubricating oil to flow through an outer periphery is sufficiently assured and a drag torque is reduced.

11 Claims, 7 Drawing Sheets

F I G. 1A
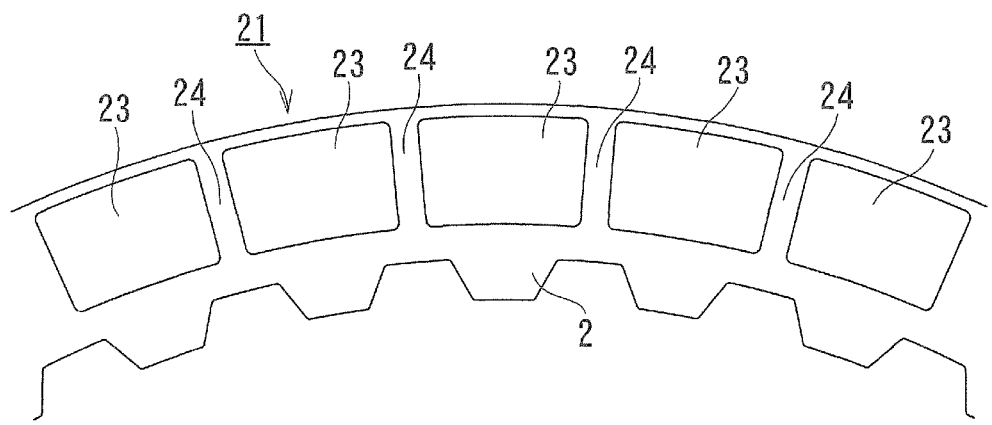
F I G. 1B
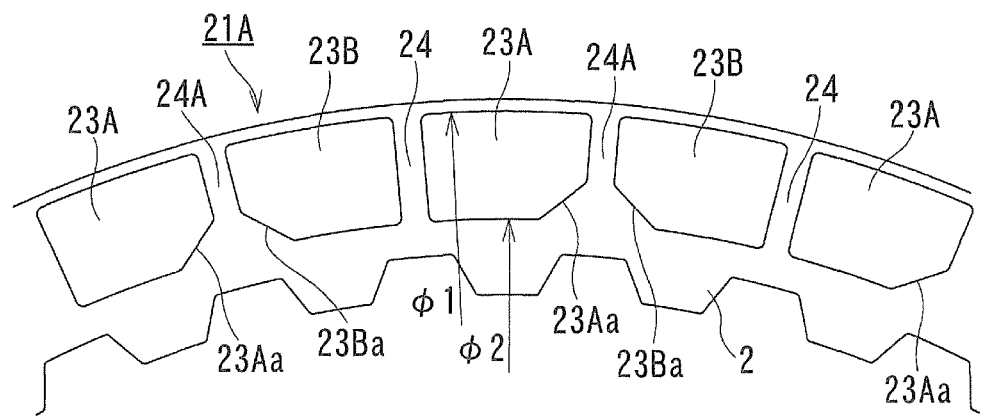

F I G. 5
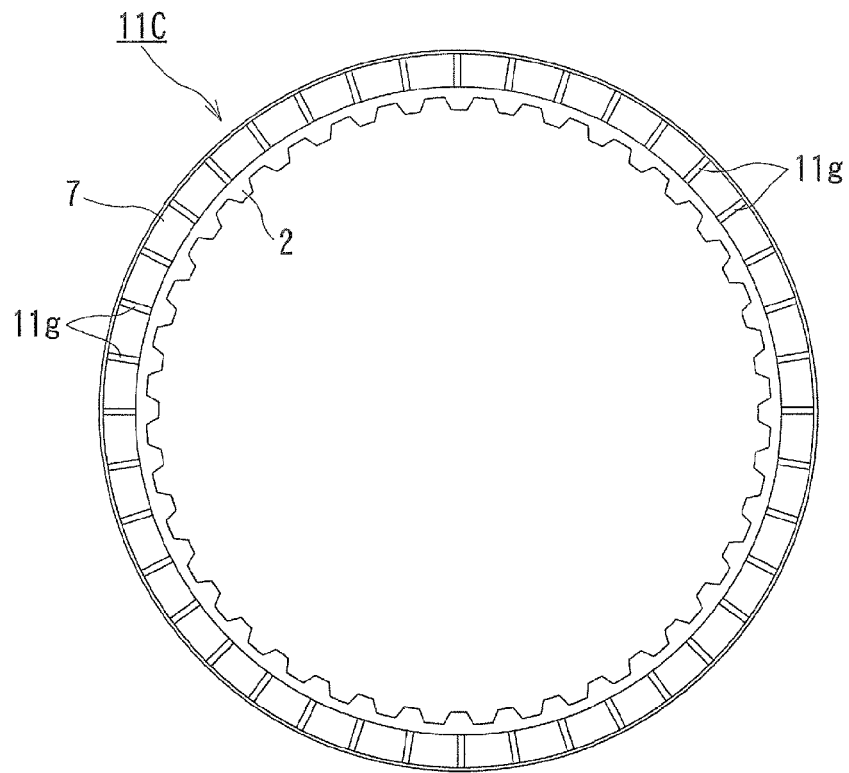
F I G. 6
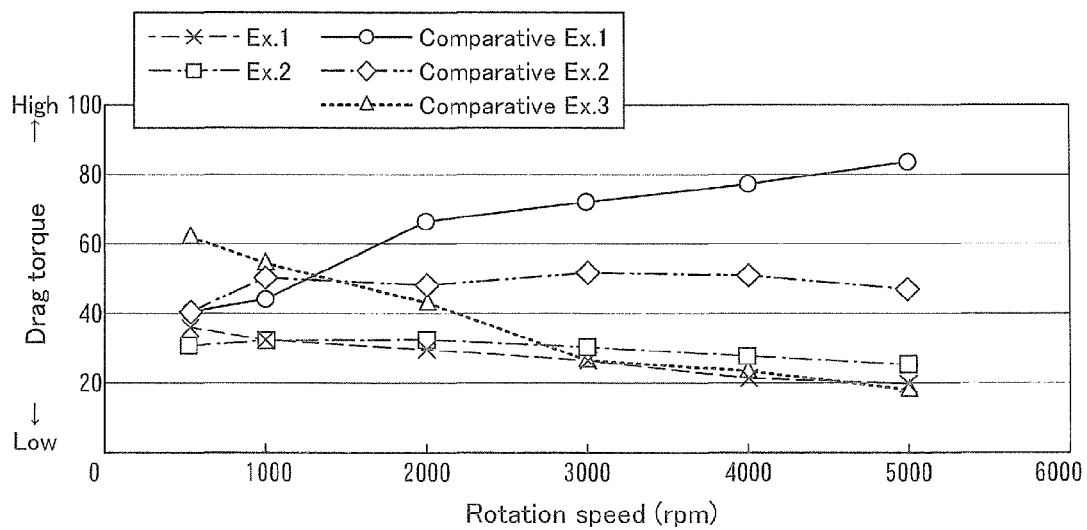

SEGMENT TYPE FRICTION MATERIAL

CROSS REFERENCE TO RELATED APPLICATIONS

This application is a National Stage of International Application No. PCT/JP2010/062589 filed Jul. 27, 2010, claiming priority based on Japanese Patent Application No. 2009-212819 filed Sep. 15, 2009 the contents of all of which are incorporated herein by reference in their entirety.

TECHNICAL FIELD

This invention relates to a wet friction material that generates a torque by applying a high pressure to an opposite surface while being immersed in an oil and more particularly to a segment-type friction material wherein a plurality of segment pieces made by cutting a friction material substrate is joined on both surfaces along an entire circumference or on one surface along an entire circumference of a ring-shaped metal core with an adhesive.

BACKGROUND ART

In recent years, a segment-type friction material is under development as a wet friction material in order to improve material yield with resultant cost reduction and to lessen drag torque with resultant high fuel efficiency in a vehicle. The segment-type friction material has a flat ring shaped metal core and segment pieces made of friction material substrates cut into a segment piece shape along a circumference of the flat ring shape of the metal core. A set of the segment pieces is arranged and joined with an adhesive on one surface of the metal core side by side along an entire circumference of the metal core with an interval to be an oil groove. Another set of the segment pieces made of friction material substrates cut into a segment piece shape is joined on a rear surface of the metal core with an adhesive, too. Such segment-type friction material is applicable to a friction material clutch device that has a single or plural friction plates for use in an automatic transmission, which may be hereafter referred to as "AT", of automobiles or motorcycles or the like.

As an example, a wet hydraulic clutch is used for an automatic transmission of an automobile or the like. The wet hydraulic clutch has a plurality of segment-type friction materials and a plurality of separator plates laid alternately on one another. Both the plates are contacted with a hydraulic pressure to transmit a torque. Lubricating oil or automatic transmission fluid, which may be hereafter referred to as "ATF", is supplied to between both the plates for the purpose of absorbing frictional heat generated when they are shifted from a disengaged state to an engaged state or preventing abrasion of the friction material and the like. "ATF" is a registered trademark of Idemitsu Kosan Co., Ltd.

However, a distance between the segment-type friction materials and the separator plates associated therewith is set small in order to increase response of the hydraulic clutch. In addition, a total area of an oil passage provided on the segment-type friction material is restricted in order to assure a sufficient torque transmission capacity when the hydraulic clutch is engaged. As a result, there was a problem that drag torque was generated depending on quantity of oil flowing through the oil passage.

In order to solve such a problem, a patent document 1 discloses a wet friction member comprising oil grooves formed between adjacent ones of segment pieces, wherein an interval of the oil grooves becomes narrower from an inner peripheral side thereof toward an outer peripheral side thereof. Thereby, ATF running from the inner peripheral side toward the outer peripheral side of the oil grooves is blocked at a point where the interval of the oil grooves is changed and a part of ATF overflows and runs over surfaces of the segment pieces. Therefore, cooling effect by ATF can be improved while making heat resistance better and a drag torque can be reduced.

PATENT DOCUMENT 1: Japanese Patent Laid-Open Publication No. 2001-295859

DISCLOSURE OF THE INVENTION

Problems that the Invention is to Solve

In the techniques described in the patent document 1, ATF is supposed to be supplied from an inner peripheral side of a metal core of a segment-type friction material. The invention also has problems as follows. That is, an effect to reduce a drag torque is very low and it is hard to significantly increase fuel efficiency in a vehicle when ATF is not supplied through a hub hole in an actual machine or a stirring torque increases with an oil sump formed on an outer periphery.

The present invention attempts to solve such problems. It is an object of the present invention to provide a segment-type friction material that certainly obtains a greater effect to reduce a drag torque in a wide range of rotation speeds even if lubricating oil is not supplied from an inner peripheral side of a metal core of the segment-type friction material or a stirring torque increases with an oil sump formed on an outer periphery.

Means for Solving the Problem

A segment-type friction material according to the invention is a segment-type friction material wherein a plurality of segment pieces made by cutting a friction material substrate is joined on both surfaces along an entire circumference or on one surface along an entire circumference of a ring-shaped metal core with an adhesive so that a plurality of oil grooves is formed to extend in a radial direction by a clearance between adjacent ones of the segment pieces. A supply passage is provided on a top surface of the segment piece for supplying lubricant oil to the top surface, and the lubricant oil supplied to the supply passage is spread via the supply passage further from an inner peripheral side to an outer peripheral side of the top surface of the segment piece or further from the outer peripheral side to the inner peripheral side of the surface of the segment piece.

In a segment-type friction material according to the invention, the supply passage is a recess provided on the top surface of the segment piece to reach from an inner peripheral end portion to an outer peripheral end portion of the segment piece.

In a segment-type friction material according to the invention, a cross section area perpendicular to a longitudinal direction of the supply passage is within a range of 10% or more and less than 100% of a cross section area perpendicular to a longitudinal direction of the oil groove, more preferably within a range of 30% to 50%.

In a segment-type friction material according to the invention, one or both of outer peripheral corner portions, which faces the oil groove, of the segment piece is rounded or chamfered. Here, "one or both of outer peripheral corner portions, which faces the oil groove of the segment pieces, is rounded or chamfered" means that it includes cutting a corner portion straight across and rounding off a corner portion and there is no substantial border between them.

In a segment-type friction material according to the invention, all of the plurality of the oil grooves are symmetrical in shape, and at least every other oil groove of the plurality of the oil grooves includes an outer peripheral opening portion having a symmetrical shape and being broadened at a width four or more times as large as a width of a narrowest portion of the plurality of the oil grooves. "at least every other oil groove of the plurality of the oil grooves" means that an oil groove having an outer peripheral opening portion that is wider by four times or more of the width of the narrowest portion of the oil groove is provided at least on every other one of the oil grooves, and that two oil grooves each having an outer peripheral opening portion that is not enlarged or two oil grooves each having an enlarged outer peripheral opening portion may be disposed in a row.

In a segment-type friction material according to the invention, all of the plurality of oil grooves are symmetrical in shape, and all of the plurality of the oil grooves includes an outer peripheral opening portion having a symmetrical shape and being broadened at a width four or more times as large as a width of a narrowest portion of the plurality of the oil grooves.

In a segment-type friction material according to the invention, a circumferential width of the rounded part or the chamfered part is 3 mm or more or within a range of 15% to 50% of a circumferential width of the segment piece and three times or more of a width of a narrowest portion of the plurality of the oil grooves, and a radial width of the rounded part or the chamfered part is within a range of 20% to 100% of a radial width of the segment piece.

In a segment-type friction material according to the invention, a dent is further provided at an outer peripheral center portion of the segment piece to be recessed against an outer peripheral side.

Effects of the Invention

In the segment-type friction material according to the invention, the segment piece has the supply passage formed on the top surface to supply the lubricating oil to the top surface. The lubricating oil supplied to the supply passage overflows therefrom to be spread further from the inner peripheral side to the outer peripheral side of the top surface of the segment piece or from the outer peripheral side to the inner peripheral side of the top surface of the segment piece. Thereby, a clearance between the segment-type friction material and a separator plate is assured by making the lubricating oil flow into the supply passage.

With such structures, when the segment-type friction material runs idle in any direction in a disengaged state, in case of the specification in which lubricating oil supply from an inner peripheral side of the segment-type friction material, lubricating oil is not supplied from the inner peripheral side, the lubricating oil supplied from the outer peripheral side of the segment piece overflows to the top surface of the segment piece through the supply passage to be spread from the outer peripheral side to the inner peripheral side of the segment piece. Thereby, a clearance between the segment-type friction material and the separator plate is assured and only the segment-type friction material runs idle smoothly.

In addition, even in case of the specification in which the lubricating oil is supplied from the inner peripheral side thereof, the lubricating oil overflows to the top surface of the segment piece through the supply passage to be spread from the inner peripheral side to the outer peripheral side of the segment piece. Thereby, a clearance between the segment-type friction material and the separator plate is assured and only the segment-type friction material runs idle smoothly. Consequently, not only when a relative rotation speed is low but also when the relative rotation speed is high, the clearance between the segment-type friction material and the separator plate can be assured and a situation where a drag torque increases can be certainly prevented.

As described above, there is provided a segment-type friction material that can certainly obtain a greater effect to reduce a drag torque in a wide range of rotation speeds even if lubricating oil is not supplied from the inner peripheral side or a relative rotation speed is high.

In the segment-type friction material according to the invention, the supply passage is a recess formed on the top surface of the segment piece and extending from the inner peripheral edge portion to the outer peripheral edge portion of the segment piece. Thus, in addition to the above described effects of the invention, the lubricating oil flows into the supply passage to make the lubricating oil flow more smoothly between an inner periphery and an outer periphery so as to assure a clearance between the segment-type friction material and the separator plate. Thereby, only the segment-type friction material runs idle smoothly. In addition, since only the recess is provided on the top surface of the segment piece, the lubricating oil can be supplied to all over the surface of the segment piece with a simple structure.

In the segment-type friction material according to the invention, a cross section area in the thickness direction of the segment piece that is perpendicular to the longitudinal direction of the supply passage is within a range of not less than 10% and less than 100% of the cross section area in the thickness direction of the segment piece that is perpendicular to the longitudinal direction of the. Thus, in addition to the above described effects of the invention, the lubricating oil more certainly overflows to the top surface of the segment piece around the supply passage and a clearance between the segment-type friction material and the separator plate is assured. Thereby, a situation where a drag torque increases is certainly prevented.

More specifically, if a cross section area of the supply passage is less than 10% of that of the oil groove, the lubricating oil is hard to flow into the supply passage. On the other hand, if the cross section area of the supply passage is 100% or more of that of the oil groove, the supply passage serves as a normal oil groove and it is hard to obtain an effect to make the lubricating oil overflow to the top surface of the segment piece. Therefore, the cross section area of the supply passage is preferably within a range of 10% or more and less than 100% of that of the oil groove. In addition, the cross section area of the supply passage is more preferably within a range of 30% to 50% of that of the oil groove, since the lubricating oil more certainly flows into the supply passage and the effect to make the lubricating oil overflow to the top surface of the segment piece can be more certainly obtained.

The segment-type friction material according to the invention, the rounded or chamfered part is formed by rounding or chamfering one or both of outer peripheral corner portions of the segment piece facing the oil groove. Thus, in addition to the above described effects of the invention, the plurality of the oil grooves extending in the radial direction formed by the clearance between adjacent ones of the segment pieces have the outer peripheral opening portion extended in a curved shape or a linear shape and the lubricating oil flowing from the outer peripheral side of the segment-type friction material is blocked at an enlarged portion which is the rounded or chamfered part. Thereby, the lubricating oil readily overflows to the top surface of the segment piece and a space for the lubricating oil to flow through the outer periphery of the segment-type friction material is sufficiently assured.

With such a structure, when the segment-type friction material runs idle in any direction in a disengaged state, in the specification in which no lubricating oil is supplied from the inner peripheral side thereof, the lubricating oil supplied from the outer peripheral side of the segment-type friction material is blocked at the enlarged portion and overflows to the top surface of the segment piece. Thereby, a clearance between the segment-type friction material and the separator plate is assured and only the segment-type friction material runs idle smoothly. In addition, even in case of the specification in which the lubricating oil is supplied from the inner peripheral side thereof, the space for lubricating oil to flow through an outer periphery of the segment-type friction material is sufficiently assured. Thereby, a situation where a drag torque increases due to an oil sump formed on the outer periphery can be certainly prevented.

In the segment-type friction material according to the invention, the plurality of the oil grooves is all symmetrical in shape. Thus, in addition to the above described effects of the invention, function and effect is provided such that the same effect to reduce a drag torque can be obtained even if the segment-type friction material runs idle in any direction. Moreover, the oil groove having the outer peripheral opening portion enlarged at the width of four times or more of the width of the narrowest portion of the oil groove is provided at least every other one of the plurality of the oil grooves. Thereby, a greater effect to reduce a drag torque can be certainly obtained.

In the segment-type friction material according to the invention, a the plurality of the oil grooves is all symmetrical in shape. Thus, in addition to the above described effects of the invention, function and effect is provided such that the same effect to reduce a drag torque can be obtained even if the segment-type friction material runs idle in any direction. Moreover, all of the outer peripheral opening portions of the plurality of the oil grooves are enlarged at the width of four times or more of the width of the narrowest portion of the plurality of the oil grooves. Thereby, a greater effect to reduce a drag torque can be more certainly obtained.

In the segment-type friction material according to the invention, the circumferential width of the rounded or chamfered part is 3 mm or more or within a range of 15% to 50% of the circumferential width of the segment piece and three times or more of the width of the narrowest portion of the plurality of the oil grooves. In addition, the radial width of the rounded or chamfered part is within a range of 20% to 100% of the radial width of the segment piece.

As a result of extensive experiments and research, in order to obtain an effect that a drag torque is more effectively reduced in the segment-type friction material provided with a supply passage, the present inventors found that the circumferential width of the rounded or chamfered part should be 3 mm or more or within a range of 15% to 50% of the circumferential width of the segment piece and three times or more of the width of the thinnest portion of the plurality of the oil grooves, while the radial width of the rounded or chamfered part should be within a range of 20% to 100% of the radial width of the segment piece. The present inventors reached the present invention based on the above-described knowledge.

More specifically, if the circumferential width of the rounded or chamfered part is less than 3 mm or less than 15% of the circumferential width of the segment piece, the segment-type friction material has a decrease in width of an outer peripheral opening portion formed at an outer peripheral side of an oil groove. Thereby, an amount of lubricating oil supplied from the outer peripheral side and overflowing to the top surface of the segment piece may be insufficient. Moreover, a space for lubricating oil to flow through an outer periphery of the segment-type friction material is not sufficiently assured. Thereby, an effect to reduce a drag torque may not be sufficiently obtained due to an oil sump formed on the outer periphery.

On the other hand, if the circumferential width of the rounded or chamfered part is over 50% of the circumferential width of the segment piece, the width of the outer peripheral opening portion becomes excessively large and lubricating oil may not be smoothly supplied from the outer peripheral side. In addition, if the segment pieces are rounded or chamfered into a symmetrical shape, a circumferential width of the rounded or chamfered part is limited up to 50% of the circumferential width of the segment piece.

In addition, the circumferential width of the rounded or chamfered part is preferably three times or more of the width of the thinnest portion of the plurality of the oil grooves. It means that the width of the outer peripheral opening portion is preferably four times or more of the width of the thinnest portion of the oil groove (when only one side of the oil groove is rounded or chamfered) or seven times or more of the width of the thinnest portion of the oil groove (when both sides of the oil groove are rounded or chamfered).

Moreover, if the radial width of the rounded or chamfered part is less than 20% of the radial width of the segment piece, the segment-type friction material has a decrease in depth (decrease in length) of the outer peripheral opening portion formed at the outer peripheral side of the oil grooves. Thereby, an amount of lubricating oil supplied from the outer peripheral side and overflowing to the top surface of the segment piece may be insufficient and a space for the lubricating oil to flow through the outer periphery of the segment-type friction material is not sufficiently assured. Therefore, an effect to reduce a drag torque may not be sufficiently obtained due to an oil sump formed on the outer periphery. In addition, the radial width of the rounded or chamfered part is limited up to 100% of the radial width of the segment piece.

Here, the circumferential width of the rounded or chamfered part is more preferably within a range of 25% to 40% of the circumferential width of the segment piece and the radial width of the rounded or chamfered part is more preferably within a range of 25% to 50% of the radial width of the segment piece. In this case, an effect to reduce a drag torque can be more certainly obtained sufficiently.

In the segment-type friction material according to the invention, a recess is provided at the outer peripheral center portion of the segment piece held between the plurality of the oil grooves so as to be recessed to the outer peripheral side. Therefore, the lubricating oil supplied from the outer peripheral side overflows to the top surface of the segment piece not only from the rounded or chamfered part but also from the recess. Thereby, a greater effect to reduce a drag torque can be certainly obtained and a space for the lubricating oil to flow through an outer periphery of the segment-type friction material becomes larger. Thereby, a situation where a drag torque increases due to an oil sump formed on the outer periphery can be more certainly prevented.

BRIEF DESCRIPTION OF THE DRAWINGS

FIG. 1A is a partial plan view showing a part of a conventional segment-type friction material, and FIG. 1B is a partial plan view showing a part of a conventional segment-type friction material (Comparative Example 1) according to a first modified example.

4A is a plan view showing an entire structure of a segment-type friction material (Example 2) according to a fifth modified example of the embodiment of the present invention.

FIG. 5 is a plan view showing an entire structure of a conventional ring-type friction material (Comparative Example 3).

FIG. 6 is a graph showing a relation between a relative rotation speed and a drag torque in the segment-type friction materials (Examples 1, 2) according to the embodiment of the present invention as compared with the conventional segment-type and ring-type friction materials (Comparative Examples 1, 2, 3).

EXPLANATION OF CODES 1, 1A, 1B, 1C, 1D, 1F, 1G, 1H, 1J, 1K, 1L: segment-type friction material
2: metal core
3, 3A, 3B, 3C, 3D, 3E, 3F, 3G, 3H, 3J, 3K, 3L: segment piece
3g, 3Ag, 3Bg, 3Cg, 3Dg, 3Eg, 3Fg, 3Gg, 3Hg, 3Jg, 3Kg, 3Lg: supply passage
4, 4A, 4B, 4C: oil groove

DETAILED DESCRIPTION OF PREFERRED EMBODIMENTS

A preferred embodiment of the present invention is described hereafter referring to FIGS. 1 to 9. FIG. 1A is a partial plan view showing a part of a conventional segment-type friction material, and FIG. 1B is a partial plan view showing a part of a conventional segment-type friction material (Comparative Example 1) according to a first modified example. FIG. 2A is a partial plan view showing a part of a conventional segment-type friction material according to a second modified example, FIG. 2B is a partial plan view showing a part of a conventional segment-type friction material (Comparative Example 2) according to a third modified example, and FIG. 2C is a partial plan view showing a part of a segment-type friction material according to a sixth modified example.

Figure 3A:
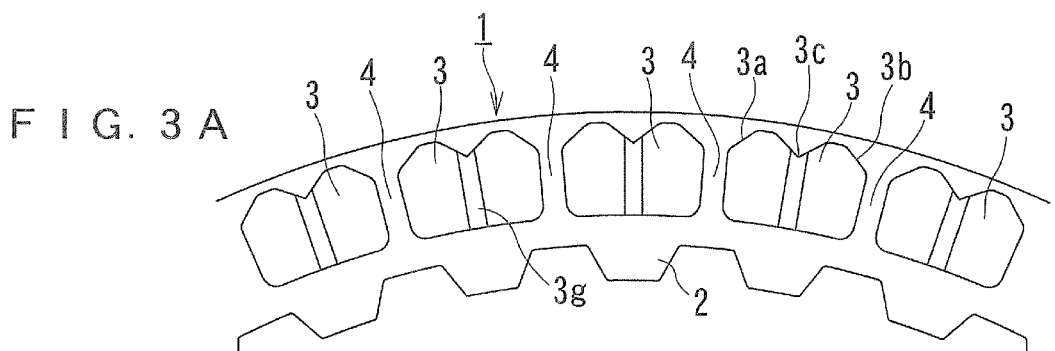
FIG. 3A is a partial plan view showing a part of a segment-type friction material according to an embodiment of the present invention.
Figure 3B:
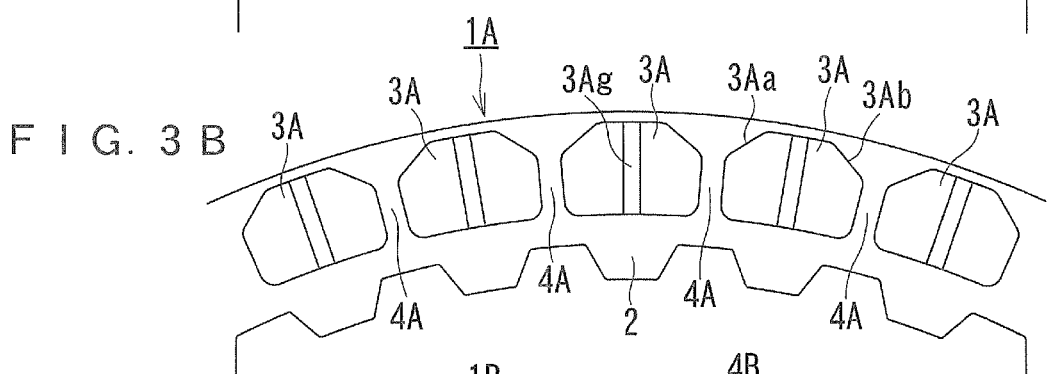
FIG. 3B is a partial plan view showing a part of a segment-type friction material according to a first modified example of the embodiment of the present invention.
Figure 3C:
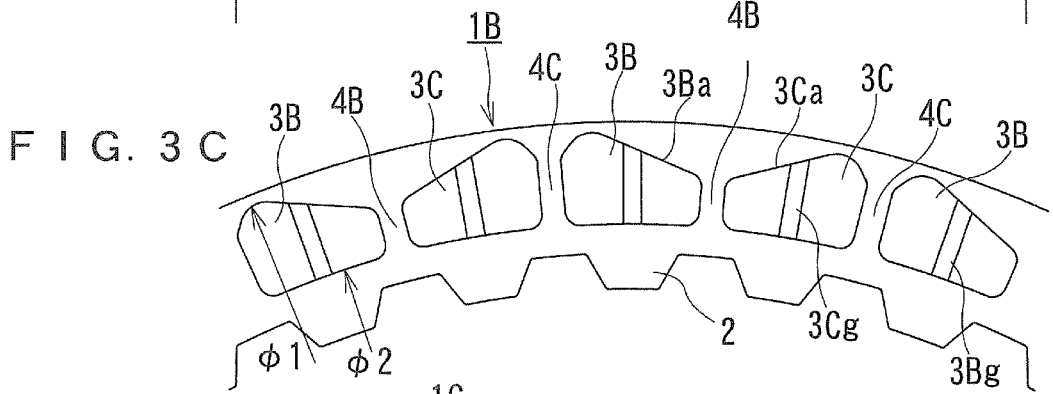
FIG. 3C is a partial plan view showing a part of a segment-type friction material (Example 1) according to a second modified example of the embodiment of the present invention.
Figure 3D:
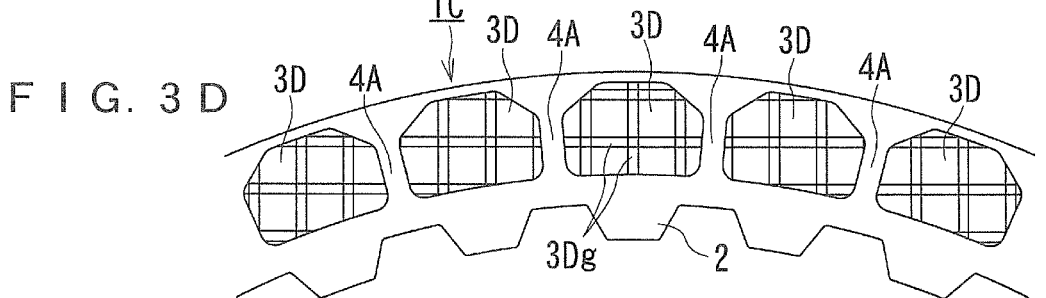
FIG. 3D is a partial plan view showing a part of a segment-type friction material according to a third modified example of the embodiment of the present invention.
Figure 3E:
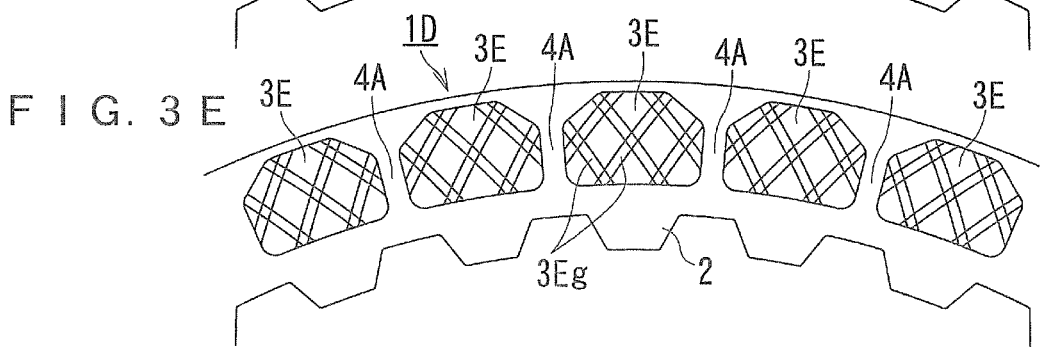
FIG. 3E is a partial plan view showing a part of a segment-type friction material according to a fourth modified example of the embodiment of the present invention.

FIG. 3A is a partial plan view showing a part of a segment-type friction material according to an embodiment of the present invention, FIG. 3B is a partial plan view showing a part of a segment-type friction material according to a first modified example of the embodiment of the present invention, FIG. 3C is a partial plan view showing a part of a segment-type friction material (Example 1) according to a second modified example of the embodiment of the present invention, FIG. 3D is a partial plan view showing a part of a segment-type friction material according to a third modified example of the embodiment of the present invention, and FIG. 3E is a partial plan view showing a part of a segment-type friction material according to a fourth modified example of the embodiment of the present invention.

Figure 4A:
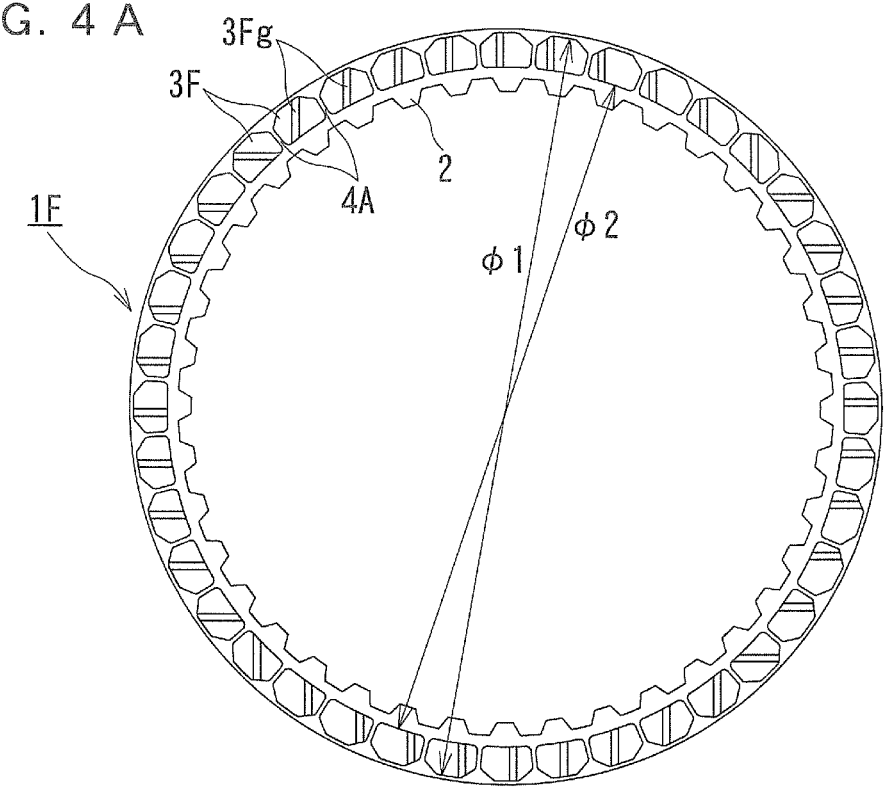
FIG. 4B is a plan view showing an entire structure of a segment-type friction material according to a sixth modified example of the embodiment of the present invention.
Figure 4B:
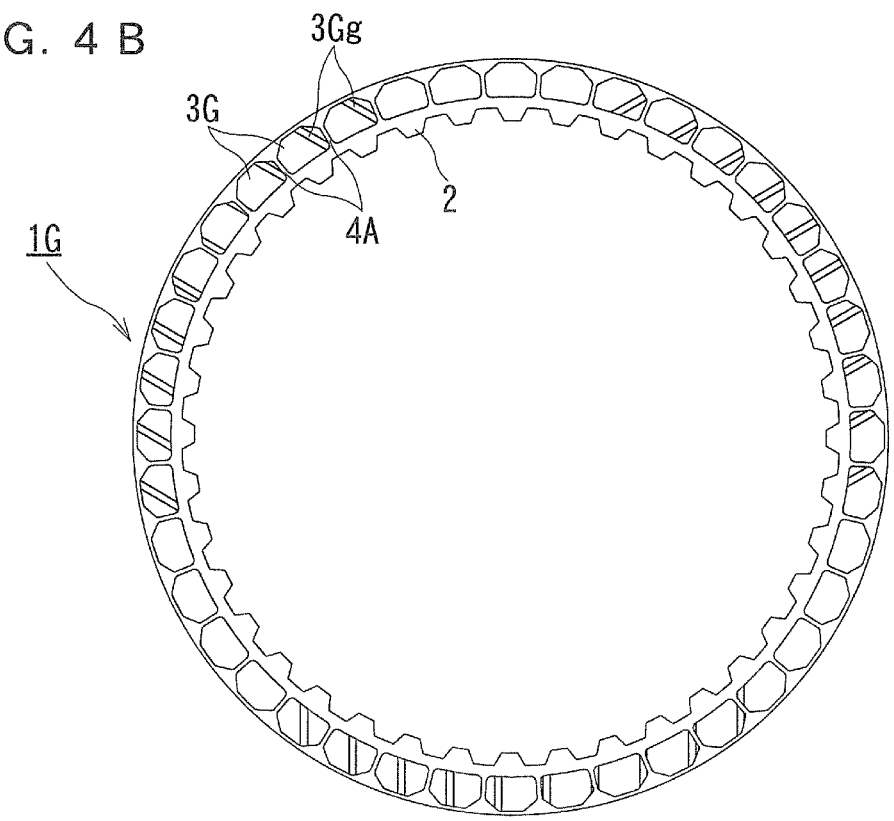

FIG. 4A is a plan view showing an entire structure of a segment-type friction material (Example 2) according to a fifth modified example of the embodiment of the present invention, and FIG. 4B is a plan view showing an entire structure of a segment-type friction material according to a sixth modified example of the embodiment of the present invention. FIG. 5 is a plan view showing an entire structure of a conventional ring-type friction material (Comparative Example 3).

Figure 7:
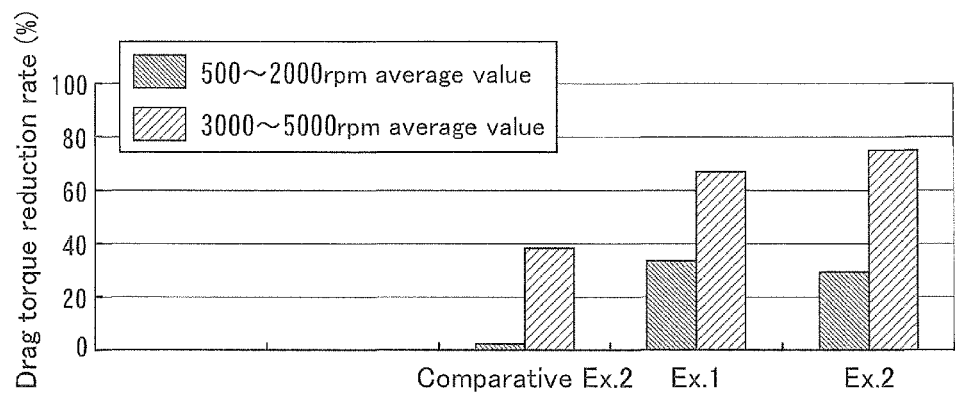
FIG. 7 is a graph showing an effect to reduce a drag torque in the segment-type friction materials (Examples 1, 2) according to the embodiment of the present invention as compared with the conventional segment-type friction materials (Comparative Examples 1, 2).
Figure 8:
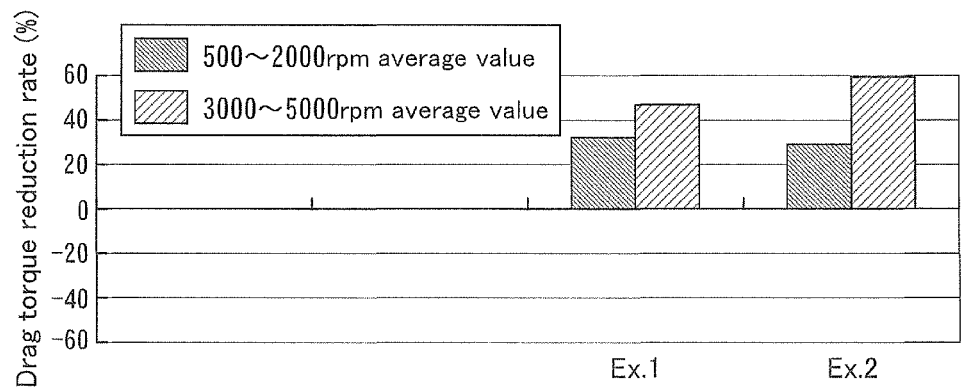
FIG. 8 is a graph showing an effect to reduce a drag torque in the segment-type friction materials (Examples 1, 2) according to the embodiment of the present invention as compared with the conventional segment-type friction material (Comparative Example 2).

FIG. 6 is a graph showing a relation between a relative rotation speed and a drag torque in the segment-type friction materials (Examples 1, 2) according to the embodiment of the present invention as compared with the conventional segment-type and ring-type friction materials (Comparative Examples 1, 2, 3). FIG. 7 is a graph showing an effect to reduce a drag torque in the segment-type friction materials (Examples 1, 2) according to the embodiment of the present invention as compared with the conventional segment-type friction materials (Comparative Examples 1, 2). FIG. 8 is a graph showing an effect to reduce a drag torque in the segment-type friction materials (Examples 1, 2) according to the embodiment of the present invention as compared with the conventional segment-type friction material (Comparative Example 2).

Figure 9A:
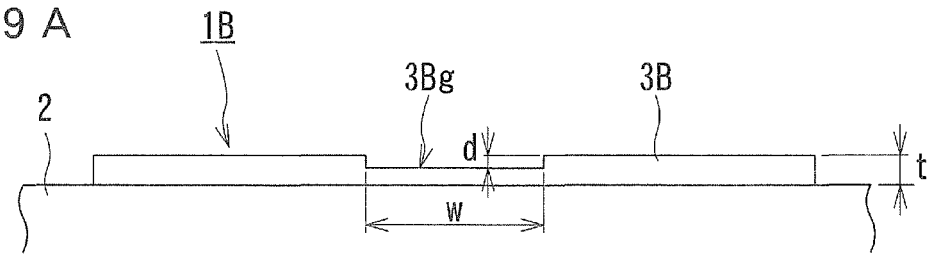
FIG. 9A is a view showing a shape of a cross section of a supply passage in the segment-type friction material (Example 1) according to the embodiment of the present invention.
Figure 9B:
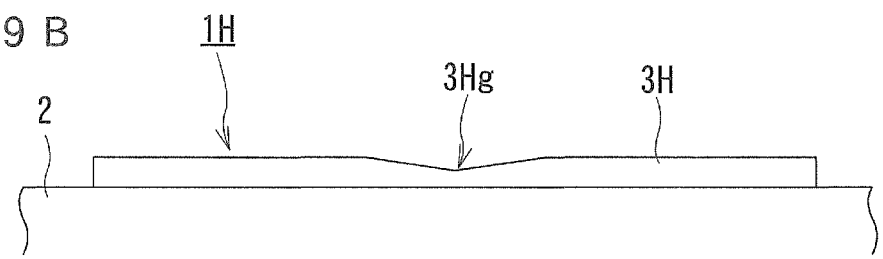
FIG. 9B is a view showing a shape of a cross section of a supply passage in a segment-type friction material according to a seventh modified example of the embodiment of the present invention.
Figure 9C:
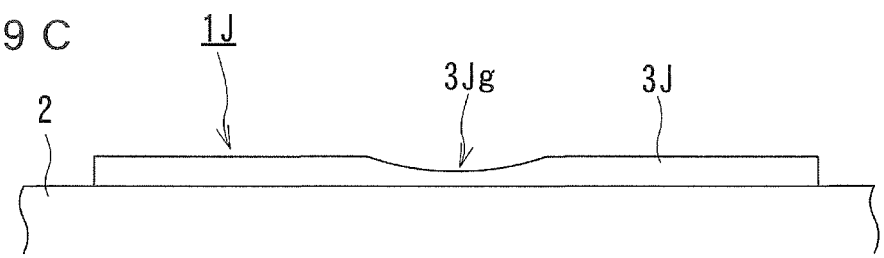
FIG. 9C is a view showing a shape of a cross section of a supply passage in a segment-type friction material according to an eighth modified example of the embodiment of the present invention.
Figure 9D:
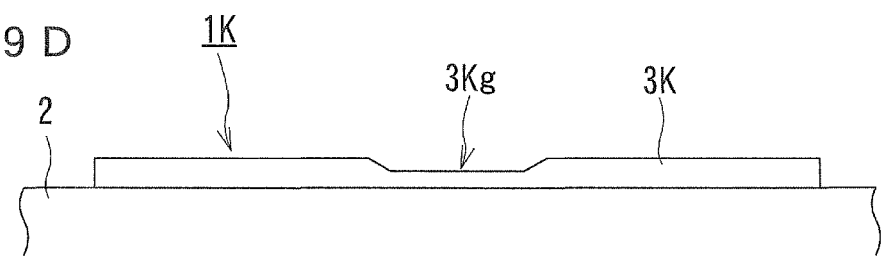
FIG. 9D is a view showing a shape of a cross section of a supply passage in a segment-type friction material according to a ninth modified example of the embodiment of the present invention.
Figure 9E:
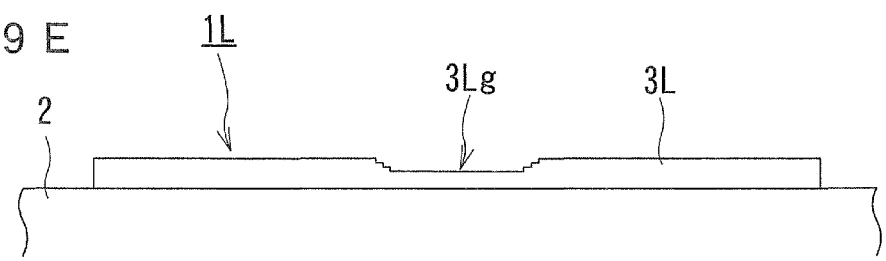
FIG. 9E is a view showing a shape of a cross section of a supply passage in a segment-type friction material according to a tenth modified example of the embodiment of the present invention.

FIG. 9A is a view showing a shape of a cross section of a supply passage in the segment-type friction material (Example 1) according to the embodiment of the present invention, FIG. 9B is a view showing a shape of a cross section of a supply passage in a segment-type friction material according to a seventh modified example of the embodiment of the present invention, FIG. 9C is a view showing a shape of a cross section of a supply passage in a segment-type friction material according to an eighth modified example of the embodiment of the present invention, FIG. 9D is a view showing a shape of a cross section of a supply passage in a segment-type friction material according to a ninth modified example of the embodiment of the present invention, and FIG. 9E is a view showing a shape of a cross section of a supply passage in a segment-type friction material according to a tenth modified example of the embodiment of the present invention.

First, segment-type friction materials according to the prior art are described hereafter referring to FIGS. 1 and 2.

As shown in FIG. 1A, a segment-type friction material 21 according to the first example of the prior art comprises a flat ring shaped metal core 2 made of a steel plate and a plurality of substantially rectangular-shaped segment pieces 23, which is cut out of a normal friction material substrate for a wet friction material, stuck on on the metal core 2 by use of an adhesive (thermosetting resin) at an interval of an oil groove 24. The segment pieces 23 are stuck on a rear surface of the metal core 2 with an adhesive in the same manner, too.

As shown in FIG. 1B, a segment-type friction material 21A according to the first modified example (Comparative Example 1) of the prior art comprises a flat ring shaped metal core 2 made of a steel plate and a plurality of segment pieces 23A, 23B, which is cut out of a normal friction material substrate for a wet friction material, stuck alternately on the metal core 2 by use of an adhesive at intervals of oil grooves 24, 24A. The segment pieces 23A, 23B are stuck on a rear surface of the metal core 2 with an adhesive in the same manner, too.

Here, a cut-in 23Aa and a cut-in 23Ba are provided on a right inner peripheral corner portion of the segment piece 23B and on a left inner peripheral corner portion of the segment piece 23B, respectively.

Figure 2A:
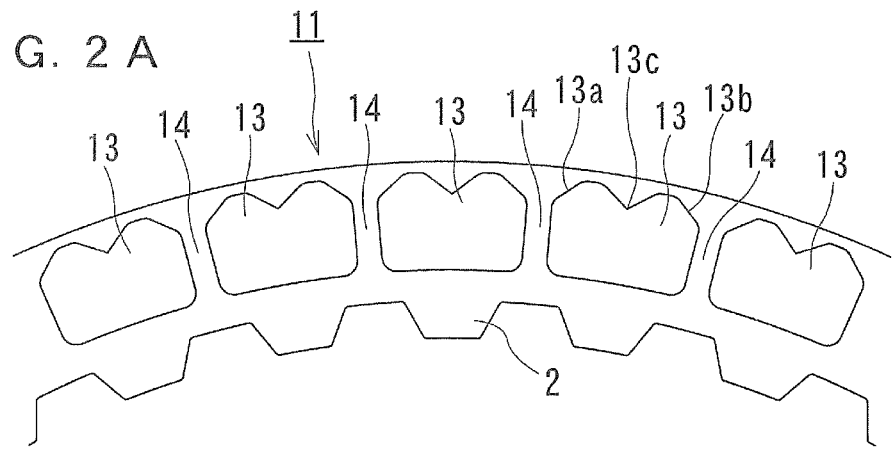
FIG. 2A is a partial plan view showing a part of a conventional segment-type friction material according to a second modified example.

As shown in FIG. 2A, a segment-type friction material 11 according to the second modified example of the prior art comprises a flat ring shaped metal core 2 made of a steel plate and a plurality of segment pieces 13, which is cut out of a normal friction material for a wet friction material, stuck side by side on the metal core 2 by use of an adhesive at an interval of an oil groove 14. The segment pieces 13 are stuck on a rear surface of the metal core 2 with an adhesive in the same manner, too. Here, both of outer peripheral corner portions of the segment piece 13 is chamfered (13a, 13b). The segment piece 13 also has a recess 13c at an outer peripheral center portion thereof. The recess 13c is concave to an outer peripheral side.

Figure 2B:
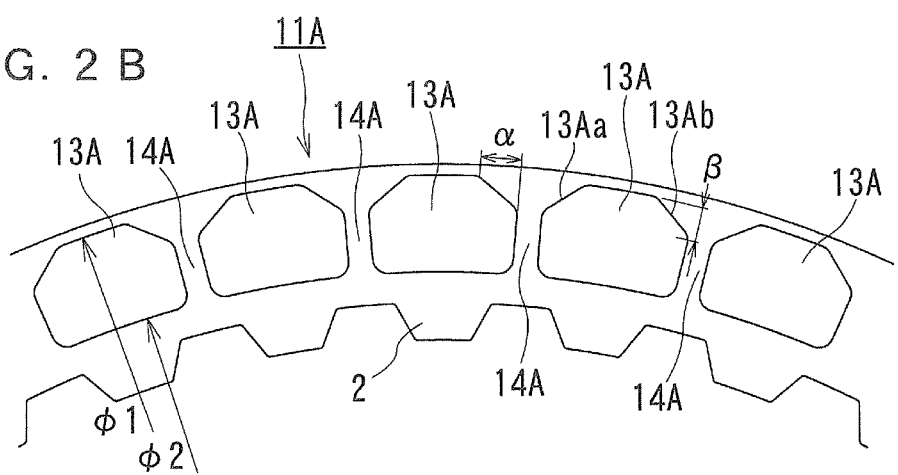
FIG. 2B is a partial plan view showing a part of a conventional segment-type friction material (Comparative Example 2) according to a third modified example.

As shown in FIG. 2B, a segment-type friction material 11A (Comparative Example 2) according to the third modified example of the prior art comprises a flat ring shaped metal core 2 made of a steel plate and a plurality of segment pieces 13A, which is cut out of a normal friction material for a wet friction material, stuck side by side on the metal core 2 by use of an adhesive at an interval of an oil groove 14A. The segment pieces 13A are stuck on a rear surface of the metal core 2 with an adhesive in the same manner, too. Here, both of outer peripheral corner portions of of the segment piece 13A are chamfered (13Aa, 13Ab).

Figure 2C:
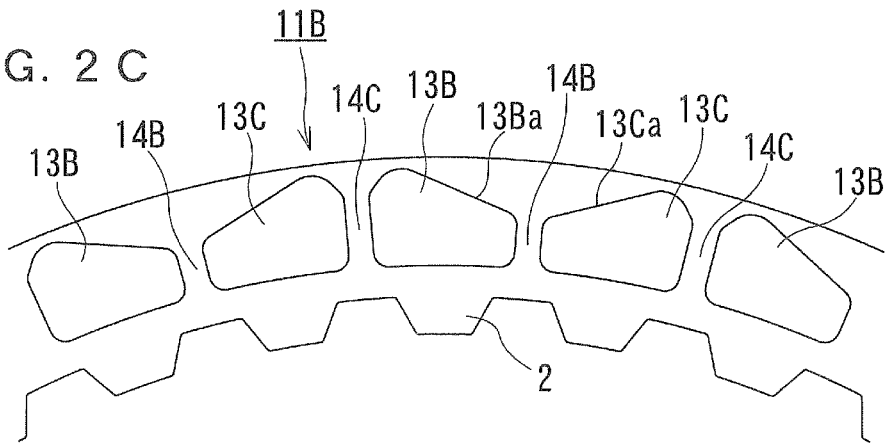
FIG. 2C is a partial plan view showing a part of a segment-type friction material according to a fourth modified example.

As shown in FIG. 2C, a segment-type friction material 11B according to the sixth modified example of the prior art comprises a flat ring shaped metal core 2 made of a steel plate and a plurality of segment pieces 13B, 13C, which is cut out of a normal friction material substrate for a wet friction material, stuck alternately on the metal core 2 by use of an adhesive at intervals of oil grooves 14B, 14C. The segment pieces 13B, 13C are stuck on a rear surface of the metal core 2 with an adhesive in the same manner, too. Here, chamfering work 13Ba is given to a right outer peripheral corner portion of the segment pieces 13B almost over an entire surface of the outer peripheral side of the segment piece 13B and chamfering work 13Ca is given to a left outer peripheral corner portion of each of the segment pieces 13C almost over an entire surface of the outer peripheral side of the segment piece 13C.

As shown in FIG. 3A, a segment-type friction material 1 according to the present embodiment comprises a flat ring shaped metal core 2 made of a steel plate and a plurality of segment pieces 3, which is cut out of a normal friction material substrate for a wet friction material, stuck side by side on the metal core 2 by use of an adhesive at an interval of an oil groove 4. The segment pieces 3 are stuck on a rear surface of the metal core 2 with an adhesive in the same manner, too. Moreover, a supply passage $3g$ is provided along a radial direction on a top surface of the segment piece 3. Here, a cut-in $3a$ and a cut-in $3b$ are provided on right and left outer peripheral corner portions of the segment piece 3. The segment piece 3 also has a recess $3c$ at an outer peripheral center portion thereof. The recess $3c$ is concave to an outer peripheral side.

Here, the supply passage $3g$ has a width of 1 mm and a depth of 0.1 mm. Thus, a cross section area of the supply passage $3g$ is 0.1 mm$^2$. The oil groove 4 has a width of 1 mm and the segment piece 3 has a thickness of 0.3 mm. Thus, a cross section area of the oil groove 4 is 0.3 mm$^2$. Therefore, a ratio of the cross section area of the supply passage $3g$ to the oil groove 4 is 33%. In addition, the depth (0.1 mm) of the supply passage $3g$ is 33% of the thickness (0.3 mm) of the oil groove 4.

Next, lubricating oil that flows through the oil groove 4 and the supply passage $3g$ is described hereafter. If the lubricating oil flows through the oil groove 4 from an outer peripheral side thereof toward an inner peripheral side thereof or from the inner peripheral side thereof toward the outer peripheral side thereof, the lubricating oil penetrates into the segment piece 3 from a face facing the oil groove 4 and the lubricating oil overflowing out of the oil groove 4 is supplied to a top surface of the segment piece 3. Here, if a constant amount of lubricating oil flows into the oil groove 4, an amount penetrating into the segment piece 3 and an amount overflowing to the top surface thereof varies depending on a flow velocity flowing through the oil groove 4. That is, the slower the flow velocity is, the more the penetrating amount into the segment piece 3 and the overflowing amount onto the top surface of the segment piece 3 are. Thus, the lubricating oil can be supplied to a portion away from the oil groove 4. In contrast, when the flow velocity of the lubricating oil becomes faster, the lubricating oil may not be sufficiently supplied to the portion away from the oil groove 4 and such insufficient supply of the lubricating oil to the segment piece 3 causes an increase in drag torque.

Here, if the supply passage $3g$ is provided on the top surface of the segment piece 3, the lubricating oil flowing through the supply passage $3g$ penetrates into the segment piece 3 from a face facing the supply passage $3g$, as in the case of the oil groove 4. However, a cross section area (product of a width and a depth of the concavity of the supply passage $3g$) of a plane of the supply passage $3g$ perpendicular to a flow direction of the lubricating oil flowing through the supply passage $3g$ (plane perpendicular to a longitudinal direction) is set at less than 100% of a cross section area (product of a width of the oil groove 4 and a thickness of the segment piece 3) of a plane of the oil groove 4 perpendicular to a flow direction of the lubricating oil flowing through the oil groove 4 (plane perpendicular to a longitudinal direction). Therefore, if the same amount of lubricating oil flows into the oil groove 4 and the supply passage 3g, the lubricating oil more readily overflows from the surface of the supply passage 3g since the cross section area thereof is small as compared with the oil groove 4.

Accordingly, the lubricating oil flowing into the supply passage 3g overflows from the supply passage 3g, while moving from an outer peripheral side thereof to an inner peripheral side thereof or from the inner peripheral side thereof to the outer peripheral side thereof, thereby being spread over the top surface of the segment piece 3, while moving from an outer peripheral side thereof to an inner peripheral side thereof or from the inner peripheral side thereof to the outer peripheral side thereof. Thus, the lubricating oil can be supplied to an entire top surface of the segment piece 3 by providing the supply passage 3g on the top surface of the segment piece 3 in addition to the oil groove 4, even if the lubricating oil is insufficiently supplied to the entire top surface of the segment piece 3 with the oil groove 4 alone. In addition, the cross section area of the supply passage 3g is set small or has a ratio less than 100% in comparison with the cross section area of the oil groove 4 to create a situation where the lubricating oil readily flows out of the supply passage 3g. However, it is not desirable to make it less than 10%, since an amount of the lubricating oil supplied through the supply passage 3g may be insufficient.

As shown in FIG. 3B, a segment-type friction material 1A (Working Example 1) according to the first modified example of the present embodiment comprises a flat ring shaped metal core 2 made of a steel plate and a plurality of segment pieces 3A, which is cut out of a normal friction material substrate for a wet friction material, stuck side by side on the metal core 2 by use of an adhesive at an interval of an oil groove 4A. The segment pieces 3A are stuck on a rear surface of the metal core 2 with an adhesive in the same manner, too. Moreover, a supply passage 3Ag is provided along a radial direction on a top surface of the segment pieces 3A.

Here, a cut-in 3Aa and a cut-in 3Ab are provided on right and left outer peripheral corner portions of the segment piece 3A. The cut-in 3Aa, 3Ab has a length (a circumferential width of the segment-type friction material 1A) of α mm and a height (a radial width of the segment-type friction material 1A) of β mm. In addition, the supply passage 3Ag has a width of 1 mm and a depth of 0.2 mm. Thus, a cross section area of the supply passage 3Ag is 0.2 mm$^2$. Moreover, the oil groove 4A has a width of 1 mm and the segment piece 3 has a thickness of 0.4 mm. Thus, a cross section area of the oil groove 4A is 0.4 mm$^2$. Therefore, a ratio of the cross section area of the supply passage 3Ag to the oil groove 4A is 50% and the depth (0.2 mm) of the supply passage 3Ag is 50% of the thickness (0.4 mm) of the segment piece 3A.

As shown in FIG. 3C, a segment-type friction material 1B (Working Example 1) according to the second modified example of the present embodiment comprises a flat ring shaped metal core 2 made of a steel plate and a plurality of segment pieces 3B, 3C, which is cut out of a normal friction material substrate for a wet friction material, stuck alternately on the metal core 2 by use of an adhesive at intervals of oil grooves 4B, 4C. The segment pieces 3B, 3C are stuck on a rear surface of the metal core 2 with an adhesive in the same manner, too. Moreover, a supply passage 3Bg and a supply passage 3Cg are provided along a radial direction on top surfaces of the segment pieces 3B and segment pieces 3C.

Here, chamfering work 3Ba is given to a right outer peripheral corner portion of the segment piece 3B almost over an entire surface of an outer peripheral side of the segment piece 3B. Chamfering work 3Ca is given to a left outer peripheral corner portion of the segment pieces 3C almost over an entire surface of an outer peripheral side of the segment piece 3C. The supply passage 3Bg, 3Cg has a width of 1 mm and a depth of 0.15 mm. Thus, a cross section area of the supply passage 3Bg, 3Cg is 0.15 mm$^2$. In addition, a width of a thinnest portion of the oil groove 4B, 4C is 1 mm, and the segment pieces has a thickness of 0.35 mm. Thus, a cross section area of the thinnest portion of the oil groove 4B, 4C is 0.35 mm$^2$. Therefore, a ratio of the cross section area of the supply passage 3Bg, 3Cg to the thinnest portion of the oil groove 4B, 4C is 43% and the depth (0.15 mm) of the supply passage 3Bg, 3Cg is 43% of the thickness (0.35 mm) of the segment piece 3B, 3C.

More specifically, in the segment-type friction material 1B according to the second modified example of the present embodiment, one of the outer peripheral corner portions of the segment piece 3B, 3C held between the plurality of the oil grooves 4B, 4C is chamfered. All of the plurality of the oil grooves 4B, 4C are symmetrical in shape. An oil groove 4B having an outer peripheral opening portion that is symmetrical in shape and is enlarged at a width of four times or more of the width of the thinnest portion of the plurality of the oil grooves 4B, 4C is provided at least every other one of the plurality of the oil grooves 4B, 4C. Moreover, the supply passages 3Bg, 3Cg are provided on the top surface of the segment piece 3B and the top surface of the segment piece 3C. The supply passage 3Bg, 3Cg has a cross section area that is 43% of the thinnest portion of the oil groove 4B, 4C and has a depth that is 43% of the thickness of the segment piece 3B, 3C.

As shown in FIG. 3D, a segment-type friction material 1C according to the third modified example of the present embodiment comprises a flat ring shaped metal core 2 made of a steel plate and a plurality of segment pieces 3D, which is cut out of a normal friction material substrate for a wet friction material, stuck side by side on the metal core 2 by use of an adhesive at an interval of an oil groove 4A. The segment pieces 3D are stuck on a rear surface of the metal core 2 with an adhesive in the same manner, too. Moreover, supply passages 3Dg are provided to extend horizontally and vertically on a top surface of the segment piece 3D at constant intervals. An outer shape of the segment piece 3D is similar to that of the above-described segment piece 3A.

As shown in FIG. 3E, a segment-type friction material 1D according to the fourth modified example of the present embodiment comprises a flat ring shaped metal core 2 made of a steel plate and a plurality of segment pieces 3E, which is cut out of a normal friction material substrate for a wet friction material, stuck side by side on the metal core 2 by use of an adhesive at an interval of an oil groove 4A. The segment pieces 3E are stuck on a rear surface of the metal core 2 with an adhesive in the same manner, too. Moreover, supply passages 3Eg are provided to cross one another in oblique directions on a top surface of the segment piece 3E at constant intervals. An outer shape of the segment piece 3E is similar to those of the segment pieces 3A, 3D.

As shown in FIG. 4A, a segment-type friction material 1F (Working Example 2) according to the fifth modified example of the present embodiment comprises a flat ring shaped metal core 2 made of a steel plate and forty pieces of segment pieces 3F, which are cut out of a normal friction material substrate for a wet friction material, stuck side by side on the metal core 2 by use of an adhesive at an interval of an oil groove 4A. Forty segment pieces 3F are stuck on a rear surface of the metal core 2 with an adhesive in the same manner, too. Moreover, a single supply passage 3Fg is provided on a top surface of each of the segment pieces 3F. An outer shape of the segment piece 3F is similar to those of the segment pieces 3A, 3D, and 3E.

As shown in FIG. 4B, a segment-type friction material 1G according to the sixth modified example of the present embodiment comprises a flat ring shaped metal core 2 made of a steel plate and forty pieces of segment pieces 3G, which are cut out of a normal friction material substrate for a wet friction material, stuck on the metal core 2 by use of an adhesive at an interval of an oil groove 4A. Forty segment pieces 3G are stuck on a rear surface of the metal core 2 with an adhesive in the same manner, too. Moreover, a single supply passage 3Gg is provided on a surface of each of twenty-nine segment pieces among the forty segment pieces 3G. An outer shape of the segment piece 3G is similar to those of the segment pieces 3A, 3D, and 3E.

As shown in FIG. 5, in order to compare a drag torque, a ring-type friction material 11C (Comparative Example 5) was produced, too. It is made by sticking ring shaped friction material substrates 7 on both surfaces of a flat ring shaped metal core 2 that is made of a steel plate. The friction material substrates 7 are made by cutting a normal friction material substrate for a wet friction material. Moreover, the ring-type friction material 11C is provided with forty oil grooves 4 in a radial direction at a regular interval.

Among the above-described segment-type friction materials according to the present embodiment and the segment-type friction materials and the ring-type friction material according to the prior art, the segment-type friction material 1A (Working Example 1) according to the second modified example of the present embodiment, the segment-type friction material 1F (Working Example 2) according to the fifth modified example, the segment-type friction material 21A (Comparative Example 1) according to the first modified example of the prior art, the segment-type friction material 11A (Comparative Example 2) according to the third modified example, and the ring-type friction material 11C (Comparative Example 3) were tested to examine a relationship between a relative rotation speed and a drag torque.

As a size of each of the segment pieces, the horizontal width of the segment piece was 13 mm and the vertical width of the segment piece was 5 mm. The number of the segment pieces was forty per one surface (eighty on both surfaces). In addition, a width of a thinnest portion of the oil groove was 1 mm, α was 2 mm, and β was 2 mm. That is, in the case of the segment piece 3A, a circumferential width (2 mm) of a chamfered part is 15.4% of a circumferential width (13 mm) of the segment piece 3A and a radial width (2 mm) of the chamfered part is 40% of a radial width (5 mm) of the segment piece 3A. It is the same in the segment piece 3F.

The test was conducted under the conditions as follows. A relative rotation speed was 500 rpm to 5000 rpm. An oil temperature of ATF was 80 degrees centigrade. An oil amount of ATF was 300 mL (oil bath lubrication and without shaft center lubrication). As for a disc size, an outer circumference Φ1 and an inner circumference Φ2 shown in FIGS. 1 to 4 were 180 mm and 160 mm. In addition, the number of the discs was three (thus, the number of steel discs as a counter material was four) and a pack clearance was 0.2 mm per plate. The results of the test are shown in FIG. 6. In FIG. 6, the magnitude of the drag torque on the vertical axis is expressed as a relative magnitude obtained by setting the magnitude of the drag torque at the uppermost end of the vertical axis at 100.

According to the results, as shown in FIG. 6, when the relative rotation speed is 1000 rpm, there is already a significant difference in the drag torque between Working Examples 1 and 2 and Comparative Examples 1 to 3. The segment-type friction materials 1A, 1F (Working Examples 1, 2) of the present embodiment have a low drag torque as compared with the Comparative Examples 1 and 2 of the segment-type friction materials 21A, 11A and Comparative Example 3 of the ring-type friction material 11C.

Then, as the relative rotation speed increases, the Working Examples 1 and 2 of the segment-type friction materials 1A and 1F have a gradual decrease in the drag torque. In contrast, the Comparative Examples 1 and 2 of the segment-type friction materials 21A, 11A have a gradual increase in the drag torque. Thereby, a gap between the Working Examples 1 and 2 and Comparative Examples 1 and 2 widens. In addition, the Comparative Example 3 of the ring-type friction material 11C has a high drag torque as compared with the Working Examples 1 and 2 during rotation in a low-speed range (500 rpm to 2000 rpm), while having a low drag torque equivalent to those of the Working Examples 1 and 2 during rotation in a high-speed range (3000 rpm to 5000 rpm).

As described above, it was proved that the segment-type friction materials 1B, 1F (Working Examples 1, 2) of the present embodiment had a great effect to reduce the drag torque in a wide range of relative rotation speeds (500 rpm to 5000 rpm) as compared with the segment-type friction materials 21A, 11A (Comparative Examples 1, 2) and ring-type friction material 11C (Comparative Example 3) according to the prior art.

A drag torque reduction rate was then calculated and evaluated based on the results of the experiments. The drag torque reduction rate is shown separately in the low-speed range (500 rpm to 2000 rpm) and high-speed range (3000 rpm to 5000 rpm). As shown in FIG. 7, at first, using the segment-type friction material 21A according to the prior art shown in FIG. 1A as a benchmark, it was represented as positive in the case where the drag torque reduction rate increased (the case where drag torque was lower), while it was represented as negative in the case where the drag torque reduction rate decreased (the case where drag torque was higher).

As a result, as shown in FIG. 7, it was found that the Comparative Example 2 of the segment-type friction material 11A also had a slight increase in the drag torque reduction rate as compared with the segment-type friction material 21A during rotation in the low-speed range, thus having some effect to reduce the drag torque. However, it was also found that the Working Examples 1 and 2 of the segment-type friction materials 1B and 1F had a still further increase in the drag torque reduction rate, thus having a significant great effect to reduce the drag torque.

In addition, during rotation in the high-speed range, the Comparative Example 2 of the segment-type friction material 11A has a great increase in the drag torque reduction rate. This may be a result of chamfering the right and left outer peripheral corner portions of the segment pieces. More specifically, such a chamfering process allows the lubricating oil at the outer peripheral side to flow smoothly, so that a flow resistance between the lubricating oil and the segment pieces is restrained and an amount of the lubricating oil flowing between the segment-type friction material 11A and the separator plate increases. Accordingly, it is found that a drag torque reduction effect can be obtained even if an oil sump is formed on an outer periphery. Moreover, during rotation in the high-speed range, the Working Examples 1 and 2 have a great increase in the drag torque reduction rate and achieve more effects as compared with the Comparative Example 2, since the Working Examples 1 and 2 have the supply passages 3Ag, 3Fg formed on the segment pieces.

Next, as shown in FIG. 8, using the Comparative Example 2 of the segment-type friction material 11A shown in FIG. 2B as a benchmark, it was represented as positive in the case where the drag torque reduction rate increased (the case where drag torque was lower), while it was represented as negative in the case where the drag torque reduction rate decreased (the case where drag torque was higher). According to the results, as shown in FIG. 8, it was found that the Working Examples 1 and 2 of the segment-type friction materials 1A and 1F had a significant increase in the drag torque reduction rate, especially during rotation in the high-speed range where the drag torque reduction rate increased by more than 40% to 50%.

As described above, when the supply passages 3Ag, 3Fg are provided on the top surfaces of the segment piece 3A, 3F, the lubricating oil can be supplied to the entire top surfaces of the segment pieces 3A, 3F in a wide range of rotation speeds from a low-speed range to a high-speed range and the drag toque can be reduced. In addition, during rotation in the high-speed range, an effect to reduce the drag torque is further improved by processing the outer peripheral portions of the segment pieces 3A, 3F.

In addition, a shape of a cross section of the supply passage is not limited to a substantially square U-shape as shown in the segment-type friction material 1A (Working Example 1) of the present embodiment. Various shapes may be applied such as a substantially V-shape as shown in FIG. 9B, a substantially U-shape as shown in FIG. 9C, a tapered shape formed on both side surfaces as shown in FIG. 9D, and a step-like tapered shape on both side surfaces as shown in FIG. 9E. More specifically, the segment-type friction materials 1H, 1J, 1K, and 1L according to the seventh modified example, the eighth modified example, the ninth modified example and the tenth modified example of the present embodiment are also expected to have an effect to reduce the drag torque equivalent to that of the segment-type friction material 1A (Working Example 1) of the present embodiment.

As described above, the segment-type friction materials 1, 1A, 1B, 1C, 1D, 1F, 1G, 1H, 1K, and 1L according to the present embodiment can more certainly obtain a greater effect to reduce the drag torque in a wide range of rotation speeds even if the lubricating oil is not supplied from the inner peripheral side (without shaft center lubrication) or a stirring torque increases due to an oil sump formed on the outer periphery. "if lubricating oil is not supplied" includes the case where an amount of the lubricating oil supplied from the inner peripheral side is insufficient.

The present embodiment was described on the segment-type friction material, as shown in FIGS. 3 and 4, in which the segment pieces 3, 3A, 3B, 3C, 3D, 3E, 3F, or 3G were stuck on only a portion close to the outer peripheral side of the metal core 2. However, as shown in the above-mentioned patent documents 1 to 3, the same effect to reduce the drag torque as that of the present embodiment can be obtained even if the segment pieces or the ring shaped friction material substrates are stuck with 90% or more of a width between an outer periphery and an inner periphery of the metal core 2.

Moreover, the same effect to reduce a drag torque as that of the present embodiment can be also obtained even if the segment pieces are joined with any percentage of the width between the outer periphery and the inner periphery of the metal core 2. In addition, the examples made by sticking the segment pieces on both surfaces of the metal core 2 were described in the present embodiment. However, the segment pieces may be stuck on only one surface of the metal core 2 depending on a specification.

In the present embodiment, only the examples made by joining forty segment pieces on one surface of the metal core 2 were described, too. However, the number of the segment pieces per one surface of the metal core 2 is not limited to forty and also the number of the oil grooves is not limited to forty. Both of them may be freely arranged at any desired sheets or any desired number. In addition, the shape of the metal core 2 is not limited to a flat ring shape and a wave shape formed by applying a wave process and the like may be applied instead.

In the practice of the present invention, the present invention is not limited to the present embodiment with respect to a structure, a shape, quantity, a material, a size, a connecting relationship, a manufacturing method or the like of other parts of the segment-type friction material. In addition, not all of the numeric values described in the present embodiment of the invention indicate a critical value, and a certain numeric value indicates an appropriate value which is suitable for the embodiment. Even if the above numeric values may be changed slightly, the present invention can be practiced as well. The preferred embodiments described herein are illustrative and not restrictive, the scope of the invention being indicated in the appended claims and all variations which come within the meaning of the claims are intended to be embraced therein.

The invention claimed is:

1. A segment-type friction material, comprising:
   a ring-shaped metal core; and
   a plurality of segment pieces made by cutting a friction material substrate, the segment pieces being joined on both surfaces along an entire circumference or on one surface along an entire circumference of the metal core with an adhesive so that a plurality of oil grooves is formed to extend in a radial direction by a clearance between adjacent ones of the segment pieces,
   wherein the segment pieces comprise a plurality of groups, while each of the plurality of groups comprising a plurality of the segment pieces arranged in succession, each of the segment pieces in each of the plurality of groups has a single supply passage provided on a top surfaces thereof for supplying lubricant oil to the top surfaces thereof such that all the segment pieces in each of the plurality of groups have the single supply passages extending in a same direction to be parallel to each other and such that the single supply passages in one of the plurality of groups extend in a direction different from a direction in which the single supply passages in another of the plurality of groups extend,
   wherein the supply passage is formed as a recess provided on the top surface of the segment piece such as to reach from an inner peripheral end portion to an outer peripheral end portion of the segment piece and such as to supply the lubricant oil from the supply passage to an entire area of the top surface of the segment piece, and
   wherein the recess of the supply passage has a cross-sectional area crossing at right angles to a longitudinal direction of the supply passage set to be within a range from 30% to 50% of a cross-sectional area crossing at right angles to a longitudinal direction of the oil groove such as to make the lubricant oil supplied to the supply passage overflow and spread via the supply passage further from an inner peripheral side to an outer peripheral side of the top surface of the segment piece or further from the outer peripheral side to the inner peripheral side of the top surface of the segment piece so as to supply the lubricant oil to an entire area of the top surface of the segment piece.

2. A segment-type friction material according to claim 1, wherein the supply passage as the recess has a constant width from a position of a top surface side to a position of a bottom surface side of the segment piece.

3. A segment-type friction material according to claim 1, wherein the supply passage as the recess has opposite side edge portions in a width direction at a top surface side of the segment piece that are shaped into substantially a channel cross-section with a cross-sectional shape being a rectangular corner, respectively.

4. A segment-type friction material according to claim 1, wherein the cross-sectional area crossing at right angles in the longitudinal direction of the supply passage is set at a value less than the cross-sectional area crossing at right angles to the longitudinal direction of the oil groove and at such a value that enables the lubricant oil to be supplied from the supply passage to the entire area of the top surface of the segment piece in case the lubricant oil from the oil groove to the entire area of the top surface of the segment piece is short in supply amount.

5. A segment-type friction material according to claim 4, wherein a ratio of the cross-sectional area crossing at right angles to the longitudinal direction of the supply passage to the cross-sectional area crossing at right angles to the longitudinal direction of the oil groove is set to such a value as to reduce a drag torque in comparison with a segment-type friction material comprising only segment pieces without any of the supply passages throughout a whole range of a rotation speed range from 500 rpm to 5000 rpm.

6. A segment-type friction material according to claim 4, wherein a ratio of the cross-sectional area crossing at right angles to the longitudinal direction of the supply passage to the cross-sectional area crossing at right angles to the longitudinal direction of the oil groove is set to such a value as to make the lubricant oil to be spread over entirety of the top surface of the segment piece throughout a whole range of a rotation speed range from 500 rpm to 5000 rpm.

7. A segment-type friction material according to claim 1, wherein the segment pieces comprise a segment piece with the supply passage formed and a segment piece without the supply passage formed.

8. A segment-type friction material according to claim 1, wherein the segment pieces comprise segment pieces with the supply passage formed and segment pieces without the supply passage formed, and the segment pieces with the supply passage formed include a first segment piece having the supply passage formed to extend in a first direction and a second segment piece having the supply passage formed to extend in a second direction that is different from the first direction.

9. A segment-type friction material according to claim 1, wherein a width of the supply passage formed on the segment piece is set at a same value as a width of the oil groove between the segment pieces.

10. A segment-type friction material according to claim 1, wherein the plurality of groups of segment pieces comprising a first group of segment pieces and a second group of segment pieces,
wherein all of the single supply passages provided on the first group of segment pieces extend in a first direction,
wherein all of the single supply passages provided on the second group of segment pieces extend in a second direction that is perpendicular to the first direction, and
wherein the first group of segment pieces and the second group of segment pieces are arranged along the circumference of the metal core such that the first direction of the single supply passage provided on the first group of segment pieces and the second direction of the single supply passage provided on the second group of segment pieces form a cross shape in relation to the entire circumference of the metal core.

11. A segment-type friction material according to claim 1, wherein the plurality of groups of segment pieces comprising a first group of segment pieces, a second group of segment pieces, and a third group of segment pieces
wherein all of the single supply passages provided on the first group of segment pieces extend in a first direction,
wherein all of the single supply passages provided on the second group of segment pieces extend in a second direction that makes an obtuse angle to the first direction,
wherein all of the single supply passages provided on the third group of segment pieces extend in a third direction that makes obtuse angles to the first direction and the second direction, and
wherein the first group of segment pieces and the second group of segment pieces and the third group of segment pieces are arranged along the circumference of the metal core such that the first direction of the single supply passage provided on the first group of segment pieces and the second direction of the single supply passage provided on the second group of segment pieces and the third direction of the single supply passage provided on the third group of segment pieces form a Y shape in relation to the entire circumference of the metal core.

* * * * *